Dec. 3, 1963 W. C. PERKINS ETAL 3,113,240

FAST SWITCHING BISTABLE THYRATRON CONTROL CIRCUIT

Filed May 25, 1959

INVENTORS
WILLIAM C. PERKINS
ELMER A. VAN DER WAL
BY [signature]
ATTORNEY

United States Patent Office 3,113,240
Patented Dec. 3, 1963

3,113,240
FAST SWITCHING BISTABLE THYRATRON CONTROL CIRCUIT

William C. Perkins and Elmer A. Van Der Wal, Cedar Rapids, Iowa, assignors to Collins Radio Company, Cedar Rapids, Iowa, a corporation of Iowa
Filed May 25, 1959, Ser. No. 815,740
2 Claims. (Cl. 315—84.5)

This invention relates generally to a bistable switch and specifically to an electronic bistable switching circuit which may be utilized to operate a remotely located transmitter and receiver.

With the increased use of electronic equipment in high speed data communication systems it becomes necessary to operate communications equipment such as a transmitter and receiver from a remotely located control station at a rapid switching rate between the transmit and receive functions. Remote operation of communications equipment is generally accomplished by the remotely located control station signaling a bistable relay which is located at or in the communication equipment. The relay is designed to alternately operate the transmitter or receiver, such that only one unit will be operating at any particular instant.

Relays, however, possess definite disadvantages when required to switch relatively high D.C. voltages and currents. Further, relays become unreliable when required to operate for extended periods at high switching rates; for example, in high speed automatic data communications systems a relay may be required to operate at least once every 100 milliseconds and be required to have a life expectancy of at least 100 million operations.

Therefore, it is an object of this invention to provide an electronic bistable switching circuit which will have extreme reliability over an extended period of time.

It is another object of this invention to provide a bistable switching circuit that can switch a relatively high D.C. voltage and current.

It is still another object of this invention to provide a bistable switching circuit that can switch a relatively high D.C. voltage and current at a high repetition rate.

It is a further object of this invention to provide an electronic switching circuit which can be operated at an extremely high repetition rate.

It is another object of this invention to provide a bistable switching circuit where a single applied pulse will switch the circuit from a first condition to a second condition.

It is still a further object of this invention to provide a bistable switching circuit which provides separate inputs to each switching element wherein the circuit will switch from the first condition to the second condition only if a pulse is received at the proper input.

This circuit features first and second thyratrons which have their plates connected in parallel. A source of power is supplied to the parallelly connected plates through a common inductor. The cathodes of the first and second thyratrons are connected to ground through first and second loads respectively. First and second capacitors are parallelly connected across the first and second loads respectively.

The control grids of each thyratron are connected both to a pulse input source and to a source of bias. When a pulse is received at the grids of the first and second thyratrons, the conducting thyratron will remain unchanged while the nonconducting thyratron will begin to conduct. Since the plate voltage is connected through a common inductor, an increase in current to the newly conducting thyratron will drop the plate voltage of the conducting thyratron below its cathode voltage, its cathode voltage being maintained by its charged cathode capacitor. The cathode capacitor on the newly conducting thyratron, however, is only in process of charging. Therefore, the plate voltage will not drop below the cathode voltage and the conducting thyratron will remain in a conductive state.

The input circuits to the grid may be separated, thereby requiring pulses to each input to cause the switching circuit to change state.

Other objects, features, and advantages of the invention will become apparent from the following description and claims when read in view of the accompanying drawings, in which:

Figure 1:
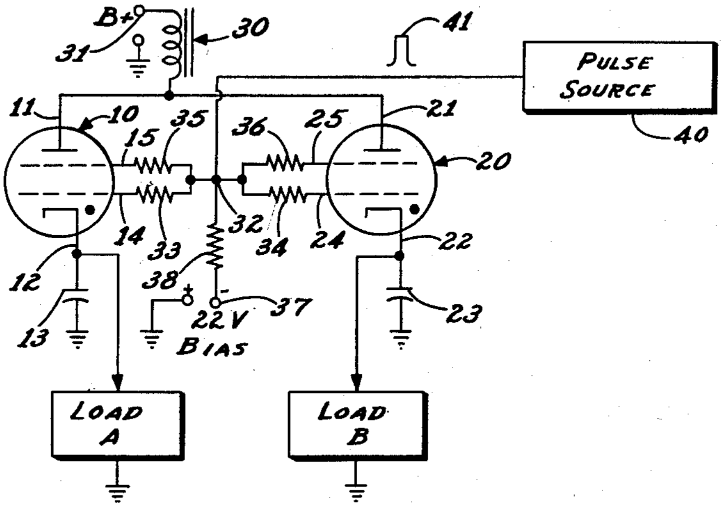
FIGURE 1 shows one embodiment of the electronic bistable switch.

Referring to FIGURE 1, a pair of thyratrons 10 and 20 contains an input such as plates 11 and 21 respectively which are connected to one end of a choke 30. A source of D.C. power 31 is connected to the other end of choke 30. A pair of output electrodes such as cathodes 12 and 22 of thyratrons 10 and 20 respectively is connected to ground through a pair of loads "A" and "B" respectively. Capacitors 13 and 23 are also respectively connected from each of the cathodes 12 and 22 to ground. The output electrodes such as grids 14, 24, 15, and 25 are connected to a junction 32 through their respective isolation resistors 33, 34, 35, and 36.

A grid bias voltage is connected to a terminal 37 through an isolation resistor 38 to junction 32. A positive pulse source 40 is connected to junction 32.

In operation either thyratron 10 or 20 would be in a conductive state. Therefore, let it be assumed that thyratron 10 is presently conductive. Switching is accomplished by application of a positive pulse of sufficient magnitude to overcome the effect of the bias at junction 32. Since thyratron 10 is already in a state of conduction, a positive pulse when applied to grids 14 and 15 will not affect its state. However, the pulse which is simultaneously applied to grids 24 and 25 of nonconductive thyratron 20 will cause thyratron 20 to conduct.

As the current increases through thyratron 20, the voltage drop across inductor 30 will increase and capacitor 23 will begin to charge. The increase in the voltage drop across inductor 30 will cause a corresponding decrease in the voltage at plates 11 and 21. Since capacitor 23 is for all practical purposes a short between the cathode 22 and ground, the current through thyratron 20 will increase rapidly limited only by the inductance of inductor 30 and the capacity of capacitor 23.

Since capacitor 13 is charged, cathode 12 will instaneously maintain its previous potential. The voltage at plate 11 will rapidly drop until it falls below the potential of cathode 12 which will cause thyratron 10 to be cut off. Although thyratron 20 experiences a similar drop of plate potential, its cathode capacitor 23 has not yet charged; therefore, the thyratron will not be cut off.

Thus, when capacitor 23 becomes charged, the current through thyratron 20 will reach a steady state which is determined by the impedance of load "B" and the voltage drop across inductor 30 will be determined only by its ohmic resistance. The switching time will, as previously mentioned, depend upon the inductance of inductor 30 and capacity of capacitor 23. Proper selection of values permits a switching time of one millisecond to be easily realized. If another pulse from pulse source 40 were to appear at junction 32, the reverse procedure would occur. Thyratron 20 would return to its original nonconductive state and thyratron 10 would return to its original conductive state.

Figure 2:
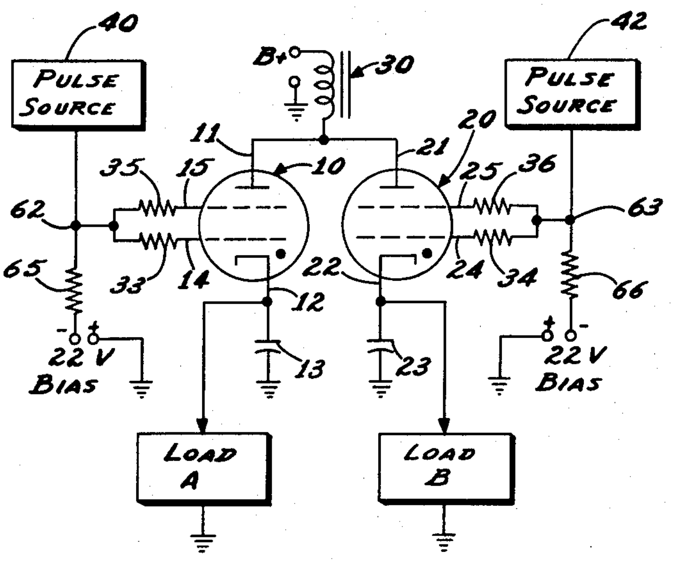
FIGURE 2 shows a second embodiment of the bistable switch.

Referring to FIGURE 2, a second embodiment is shown where the control inputs are separated. Thus in thyratron 10, grids 14 and 15 are connected to a first input terminal 62 through isolation resistors 35 and 33 respectively. A biasing resistor 65 connects the first input to a source of bias. Thyratron 20 has its grids 24 and 25 connected to a second input at terminal 63 through isolation resistors 34 and 35 respectively. Grids 24 and 25 are likewise connected to a source of bias through resistor 66. The remaining portion of this circuit is identical with that discussed in FIGURE 1.

The operation is similar to the operation of the thyratron switching circuit discussed in FIGURE 1 except that each input 62 or 63 must individually receive a pulse in order to operate the thyratron circuit. Therefore, if thyratron 10 is in a conductive state and pulse source 40 is operated, the circuit conditions will remain the same since a pulse will have no effect upon the conducting thyratron. However, if pulse source 42 is operated, a positive pulse is applied to terminal 63 and hence to grids 24 and 25 which will cause thyratron 20 to conduct. The circuit will then switch as previously discussed. Upon completion of the switching transition, thyratron 20 will be conductive and thyratron 10 will be nonconductive. Any additional pulses received at the input 63 will not change the state of the switch. Thus this embodiment provides for a switching circuit with independent control of the switching operation.

In either of the embodiments shown in FIGURE 1 or FIGURE 2, if load "A" were a receiver and load "B" were a transmitter, power could be alternately supplied to either the transmitter or receiver by a simple operation of the switching circuit.

While the circuit has been described which employs vacuum tube thyratrons, it is obvious to one skilled in the art that semiconductor thyratrons could be substituted by a proper selection of circuit voltages and components.

Thus a circuit has been described which provides for a switch capable of handling relatively high D.C. voltages and currents at an extremely rapid switching rate and which is much more reliable than the standard relay switching devices. Also a circuit has been provided where a single pulse can operate a bistable switching circuit from a first condition to a second condition.

Although this invention has been described with respect to particular embodiments thereof, it is not to be so limited as changes and modifications may be made therein which are within the spirit and scope of the invention as defined by the appended claims.

We claim:

1. A fast switching bistable control circuit, comprising: first and second thyratrons one of which is in a conductive state at all times when said circuit is energized, said thyratrons including at least a control grid, a plate and a cathode, the plates of said thyratrons being connected together, an inductor one end of which is adapted to be connected to a B+ power source and the other end of which is connected to the plates of said thyratrons, means adapting the control grids of said thyratrons for connection to a source of bias, means capacitively connecting the cathodes of said thyratrons to ground, first and second loads connected between the cathodes of said first and second thyratrons respectively and ground, a pulse source, and means connecting said pulse source to the control grids of said thyratrons whereby when a pulse from said pulse source is simultaneously applied to the control grids of said first and second thyratrons the conductive thyratron will be rendered nonconductive and the nonconductive thyratron will be rendered conductive.

2. A fast switching bistable thyratron control circuit, comprising: first and second thyratrons one of which is in a nonconductive state while the other of which is in a conductive state at all times when said circuit is energized, each said thyratron including a cathode, a control grid, and a plate, the plates of said thyratrons being directly connected together, an inductor one end of which is adapted to be connected to a B+ source of power, the remaining end of said inductor being connected to the plates of said thyratrons, a first capacitor connected between the cathode of said first thyratron and ground, a second capacitor connected between the cathode of said second thyratron and ground, means adapting the control grids of said thyratrons for connection to biasing means, means for applying a positive pulse to the control grids of said thyratrons, said pulse when applied to the control grid of said one thyratron causing said one thyratron to become conductive and causing said other thyratron to become nonconductive, and means connected to each said cathode to couple a direct voltage from each said thyratron tube while energized.

References Cited in the file of this patent

UNITED STATES PATENTS

| | | |
|---|---|---|
| 2,650,340 | Posthumus | Aug. 25, 1953 |
| 2,932,796 | Von Kummer et al. | Apr. 12, 1960 |